(12) United States Patent
Sebire

(10) Patent No.: US 9,094,984 B2
(45) Date of Patent: Jul. 28, 2015

(54) AVOIDING COLLISIONS BETWEEN SEMI-PERSISTENT ALLOCATION AND DYNAMIC ALLOCATION IN RADIO ACCESS NETWORKS

(75) Inventor: Benoist Pierre Sebire, Tokyo (JP)

(73) Assignee: Nokia Solutions and Networks OY, Espoo (FI)

( * ) Notice: Subject to any disclaimer, the term of this patent is extended or adjusted under 35 U.S.C. 154(b) by 906 days.

(21) Appl. No.: 12/664,955

(22) PCT Filed: Jun. 19, 2008

(86) PCT No.: PCT/EP2008/057755
§ 371 (c)(1),
(2), (4) Date: Jan. 11, 2010

(87) PCT Pub. No.: WO2008/155372
PCT Pub. Date: Dec. 24, 2008

(65) Prior Publication Data
US 2010/0182965 A1 Jul. 22, 2010

Related U.S. Application Data

(60) Provisional application No. 60/929,288, filed on Jun. 20, 2007.

(51) Int. Cl.
*H04J 3/00* (2006.01)
*H04L 12/413* (2006.01)
*H04W 74/08* (2009.01)
*H04L 1/18* (2006.01)

(52) U.S. Cl.
CPC ............ *H04W 74/08* (2013.01); *H04L 1/1887* (2013.01); *H04W 74/0841* (2013.01)

(58) Field of Classification Search
CPC .......... H04W 72/0446; H04W 72/048; H04W 40/08; H04W 48/08; H04W 52/383; H04W 52/46; H04W 52/50; H04L 45/00
USPC .................................................. 370/328–403
See application file for complete search history.

(56) References Cited

U.S. PATENT DOCUMENTS

| 5,172,375 A | * | 12/1992 | Kou | 370/322 |
| 5,303,207 A | * | 4/1994 | Brady et al. | 367/134 |
| 5,432,754 A | * | 7/1995 | Brady et al. | 367/134 |

(Continued)

FOREIGN PATENT DOCUMENTS

| CN | 1653741 A | 8/2005 |
| CN | 1864361 A | 11/2006 |

(Continued)

OTHER PUBLICATIONS

Zoran Hadzi-Velkov et al., "Saturation Throughput-Delay Analysis of IEEE 802.11 DCF in Fading Channel", IEEE 2003, pp. 121-126.

(Continued)

*Primary Examiner* — Nicholas Sloms
(74) *Attorney, Agent, or Firm* — Harrington & Smith

(57) ABSTRACT

A method, including receiving a request for retransmission from user equipment for a predetermined transmission time interval in a communication network; determining whether a collision risk exists between the retransmission and another transmission during the predetermined time interval; and ignoring the retransmission request when the determined collision risk exists.

30 Claims, 3 Drawing Sheets

(56) References Cited

U.S. PATENT DOCUMENTS

| | | | |
|---|---|---|---|
| 5,636,230 A | 6/1997 | Marturano et al. | 371/32 |
| 5,745,837 A * | 4/1998 | Fuhrmann | 725/114 |
| 5,991,308 A * | 11/1999 | Fuhrmann et al. | 370/395.53 |
| 6,078,568 A * | 6/2000 | Wright et al. | 370/312 |
| 6,317,854 B1 * | 11/2001 | Watanabe | 714/749 |
| 6,347,092 B1 * | 2/2002 | Serikawa et al. | 370/442 |
| 6,456,597 B1 * | 9/2002 | Bare | 370/252 |
| 6,473,403 B1 * | 10/2002 | Bare | 370/236 |
| 6,490,645 B1 * | 12/2002 | Shahaf et al. | 710/244 |
| 6,493,334 B1 * | 12/2002 | Krzymien et al. | 370/342 |
| 6,522,635 B1 * | 2/2003 | Bedwell | 370/314 |
| 6,529,520 B1 * | 3/2003 | Lee et al. | 370/442 |
| 6,556,541 B1 * | 4/2003 | Bare | 370/235 |
| 6,577,600 B1 * | 6/2003 | Bare | 370/238 |
| 6,580,715 B1 * | 6/2003 | Bare | 370/396 |
| 6,597,675 B1 * | 7/2003 | Esmailzadeh et al. | 370/335 |
| 6,807,165 B2 * | 10/2004 | Belcea | 370/347 |
| 6,845,237 B2 * | 1/2005 | Moulsley | 455/422.1 |
| 6,877,043 B2 * | 4/2005 | Mallory et al. | 709/251 |
| 6,882,634 B2 * | 4/2005 | Bagchi et al. | 370/338 |
| 6,888,844 B2 * | 5/2005 | Mallory et al. | 370/466 |
| 6,891,881 B2 * | 5/2005 | Trachewsky et al. | 375/143 |
| 6,898,204 B2 * | 5/2005 | Trachewsky et al. | 370/445 |
| 6,898,417 B1 * | 5/2005 | Moulsley | 455/69 |
| 6,954,800 B2 * | 10/2005 | Mallory | 709/240 |
| 6,975,655 B2 * | 12/2005 | Fischer et al. | 370/516 |
| 6,988,236 B2 * | 1/2006 | Ptasinski et al. | 714/758 |
| 6,993,101 B2 * | 1/2006 | Trachewsky et al. | 375/343 |
| 7,000,031 B2 * | 2/2006 | Fischer et al. | 709/248 |
| 7,035,285 B2 * | 4/2006 | Holloway et al. | 370/474 |
| 7,079,509 B2 * | 7/2006 | Belcea | 370/330 |
| 7,099,296 B2 * | 8/2006 | Belcea | 370/338 |
| 7,110,786 B2 * | 9/2006 | Moulsley et al. | 455/522 |
| 7,133,391 B2 * | 11/2006 | Belcea | 370/338 |
| 7,180,905 B2 * | 2/2007 | Benveniste | 370/445 |
| 7,187,669 B1 * | 3/2007 | Lee | 370/347 |
| 7,197,016 B2 * | 3/2007 | Belcea | 370/321 |
| 7,212,504 B2 * | 5/2007 | Belcea | 370/315 |
| 7,254,409 B2 * | 8/2007 | Sato et al. | 455/466 |
| 7,266,104 B2 * | 9/2007 | Belcea | 370/338 |
| 7,283,476 B2 * | 10/2007 | Bare | 370/236 |
| 7,310,670 B1 * | 12/2007 | Walbeck et al. | 709/225 |
| 7,321,589 B2 * | 1/2008 | Lohr et al. | 370/394 |
| 7,359,705 B2 * | 4/2008 | Kornprobst | 455/435.3 |
| 7,372,842 B2 * | 5/2008 | Kim et al. | 370/330 |
| 7,388,853 B2 * | 6/2008 | Ptasinski et al. | 370/338 |
| 7,406,106 B2 * | 7/2008 | Mallory | 370/522 |
| 7,430,164 B2 * | 9/2008 | Bare | 370/217 |
| 7,738,481 B2 * | 6/2010 | Igarashi et al. | 370/448 |
| 7,773,625 B2 * | 8/2010 | Benveniste | 370/445 |
| 8,054,852 B2 * | 11/2011 | Yamada et al. | 370/445 |
| 8,234,534 B2 * | 7/2012 | Park et al. | 714/749 |
| 8,238,892 B2 * | 8/2012 | Booker et al. | 455/420 |
| 8,254,935 B2 * | 8/2012 | Tomita et al. | 455/442 |
| 8,254,975 B2 * | 8/2012 | Kroth et al. | 455/515 |
| 8,452,477 B2 * | 5/2013 | Ergen et al. | 701/29.1 |
| 8,537,765 B2 * | 9/2013 | Manbo et al. | 370/329 |
| 2001/0014091 A1 * | 8/2001 | Yamada et al. | 370/349 |
| 2002/0027897 A1 * | 3/2002 | Moulsley et al. | 370/342 |
| 2002/0028691 A1 * | 3/2002 | Moulsley et al. | 455/522 |
| 2002/0042283 A1 * | 4/2002 | Moulsley | 455/517 |
| 2002/0080750 A1 * | 6/2002 | Belcea | 370/337 |
| 2002/0085526 A1 * | 7/2002 | Belcea | 370/337 |
| 2002/0089945 A1 * | 7/2002 | Belcea | 370/321 |
| 2002/0106985 A1 * | 8/2002 | Sato et al. | 455/3.01 |
| 2002/0150075 A1 * | 10/2002 | Belcea | 370/347 |
| 2003/0108027 A1 * | 6/2003 | Kim et al. | 370/345 |
| 2003/0114113 A1 * | 6/2003 | Kornprobst | 455/69 |
| 2003/0142638 A1 * | 7/2003 | Belcea | 370/321 |
| 2003/0142645 A1 * | 7/2003 | Belcea | 370/330 |
| 2003/0174665 A1 * | 9/2003 | Benveniste | 370/317 |
| 2003/0185166 A1 * | 10/2003 | Belcea | 370/321 |
| 2004/0077370 A1 * | 4/2004 | Dick et al. | 455/522 |
| 2005/0141477 A1 * | 6/2005 | Tomita et al. | 370/349 |
| 2005/0144643 A1 | 6/2005 | Hakenberg et al. | 725/86 |
| 2005/0237956 A1 * | 10/2005 | Kuperschmidt et al. | 370/310 |
| 2006/0154680 A1 * | 7/2006 | Kroth et al. | 455/515 |
| 2006/0291393 A1 | 12/2006 | Teague et al. | 370/235 |
| 2007/0047452 A1 * | 3/2007 | Lohr et al. | 370/242 |
| 2007/0087756 A1 * | 4/2007 | Hoffberg | 455/450 |
| 2007/0174885 A1 * | 7/2007 | Hus et al. | 725/105 |
| 2007/0183326 A1 * | 8/2007 | Igarashi et al. | 370/230 |
| 2007/0201505 A1 * | 8/2007 | Yamada et al. | 370/445 |
| 2007/0206531 A1 * | 9/2007 | Pajukoski et al. | 370/329 |
| 2007/0211749 A1 * | 9/2007 | Benveniste | 370/445 |
| 2008/0076432 A1 * | 3/2008 | Senarath et al. | 455/442 |
| 2008/0192661 A1 * | 8/2008 | Hamamoto et al. | 370/310 |
| 2008/0248760 A1 * | 10/2008 | Booker et al. | 455/88 |
| 2009/0150739 A1 * | 6/2009 | Park et al. | 714/749 |
| 2010/0182965 A1 * | 7/2010 | Sebire | 370/329 |
| 2011/0087396 A1 * | 4/2011 | Eregen et al. | 701/29 |
| 2011/0200019 A1 * | 8/2011 | Manbo et al. | 370/336 |
| 2012/0319821 A1 * | 12/2012 | Karttaavi et al. | 340/10.1 |
| 2013/0329709 A1 * | 12/2013 | Manbo et al. | 370/336 |

FOREIGN PATENT DOCUMENTS

| | | | | |
|---|---|---|---|---|
| EP | 1361689 A1 | 11/2003 | | |
| GB | 2 419 496 A | 4/2006 | | |
| GB | 2 419 497 A | 4/2006 | | |
| JP | 08163061 A | * 6/1996 | | H04H 1/02 |
| JP | 2001/156732 A | 6/2001 | | |
| JP | 2005525746 A | 8/2005 | | |
| JP | 2008519514 A | 6/2008 | | |
| RU | 2251219 C2 | 5/2003 | | |
| WO | WO 03/096617 A2 | 11/2003 | | |
| WO | WO 03/096617 A3 | 11/2003 | | |
| WO | WO 2005060145 A1 | 6/2005 | | |
| WO | WO-2007/048328 A1 | 5/2007 | | |
| WO | WO 2007/053840 A2 | 5/2007 | | |

OTHER PUBLICATIONS

Catt et al.; "Collision Avoidance While Using Synchronous HARQ"; R2-070740; 3GPP TSG-RAN WG2#55' St. Louis, USA; Feb. 12-16, 2007; whole document (4 pages).

* cited by examiner

AVOIDING COLLISIONS BETWEEN SEMI-PERSISTENT ALLOCATION AND DYNAMIC ALLOCATION IN RADIO ACCESS NETWORKS

CROSS-REFERENCE TO RELATED APPLICATIONS

This application claims the benefit of U.S. Provisional Application No. 60/929,288, filed Jun. 20, 2007.

BACKGROUND OF THE INVENTION

1. Field of the Invention

The present invention relates generally to communication networks. More specifically, the present invention relates to apparatuses, systems and methods for allocating resources in such networks.

2. Description of the Related Art

Scheduling and resource allocation is an aspect of telecommunications technology. Developments according to the third generation partnership project (3GPP) are directed to the evolution of the radio access network. Developments according to the long term evolution of radio technology are, in some cases, directed to evolved universal terrestrial radio access networks, also known as E-UTRAN. Proposals regarding scheduling in E-UTRAN include, for example, E-UTRAN being capable of dynamically allocating resources, such as physical resource blocks (PRBs) and modulation coating schemes (MCS), to user equipment at each transmission time interval (TTI) via control channels. User equipment (UE) monitors control channels, such as L1/L2, in order to find potential allocations during downlink when downlink reception is enabled. Furthermore, radio access networks such as E-UTRAN can allocate predefined downlink resources for transmissions, such as a first hybrid automatic repeat request (HARQ) error control to user equipment. Retransmissions can be explicitly signaled via L1/L2 control channels. If the user equipment cannot identify its cell radio network temporary identifier (C-RNTI) on the control channels in the sub-frames where the user equipment has been pre-assigned resources, a downlink transmission according to a predefined allocation is assumed. The user equipment, therefore, can sometimes perform blind decoding of the predefined resources. Otherwise, in the sub-frames where the user equipment has been pre-assigned resources, if the user equipment finds its C-RNTI on the control channels, the control channel allocation overrides the predefined allocation for the transmission time interval, and user equipment does not perform blind decoding of the predefined resources.

Regarding uplink scheduling, radio access networks such as E-UTRAN can dynamically allocate the resources to user equipment at each transmission time interval via the same channels. User equipment would typically monitor the L1/L2 control channels for possible allocation for uplink transmission when downlink reception enabled. Such activity is governed by discontinuous reception (DRX). Additionally, radio access networks such as E-UTRAN can allocate a predefined uplink resource for the first HARQ transmissions and potential retransmissions to user equipment. In sub-frames where the user equipment has been pre-assigned resources, if the user equipment cannot find its C-RNTI on the L1/L2 control channels, uplink transmission according to a predefined allocation assigned to the user equipment in the TTI can be made. The network performs decoding of the predefined PRBs according to the predefined MCS. Otherwise, in sub-frames where the user equipment has been pre-assigned resources, if the user equipment finds its C-RNTI on the control channels, the control channel allocation overrides the predefined allocation for that TTI. As such, the user equipment transmission follows the L1/L2 control, not the predefined allocation. Retransmissions can be exemplarily allocated using the predefined allocation or explicitly allocated via L1/L2 control channels.

In both uplink and downlink configurations, the possibility of allocating predefined resources for the first HARQ transmissions was introduced to minimize signaling overhead for services that would require frequent scheduling, such as voice over internet protocol (VOIP).

As described above, two kinds of allocations are possible in E-UTRAN: dynamic allocations and predefined allocations for the first HARQ transmissions. Due to these two types of allocations, collisions may occur between predefined resources for the first HARQ transmission and resources allocated for retransmission. A "collision" occurs when two transmissions are supposed to take place in the same TTI—one following the dynamic allocation and the other following the predefined allocation. It may be desirable to avoid such collisions in communications networks.

SUMMARY OF THE INVENTION

Certain embodiments of the present invention may provide solutions to the problems and needs in the art that have not yet been fully solved by currently available communication system technologies. For example, certain embodiments of the present invention may provide a method, apparatus, system and computer program for avoiding collisions between semi-persistent allocations and dynamic allocations in radio access networks.

In one embodiment, a method may include receiving a request for retransmission from user equipment for a predetermined transmission time interval in a communication network, determining whether a collision risk exists between the retransmission and another transmission during the predetermined time interval, and ignoring the retransmission request when the determined collision risk exists. In some embodiments, a load in the communication network may be sufficiently high that retransmission cannot be scheduled.

In another embodiment, an apparatus may include a receiving unit configured to receive a request for retransmission from user equipment for a predetermined transmission time interval in a communication network, a determining unit configured to determine whether a collision risk exists between the retransmission and another transmission during the predetermined time interval and an ignoring unit configured to ignore the retransmission request when the determining unit determines that the collision risk exists. In some embodiments, a load in the communication network may be sufficiently high that the apparatus cannot schedule retransmission. In certain embodiments, the apparatus may be an enhanced node B of the third generation partnership project.

In yet another embodiment, a method may include determining that a transmission from user equipment was unsuccessful, determining whether a retransmission will collide with a predefined resource for a predetermined transmission time interval, and transmitting an acknowledgement to the user equipment, rather than requesting retransmission, when it is determined that the retransmission will collide with the predefined resource. In some embodiments, collisions may occur due to one or more of synchronous hybrid automatic repeat request and signaling errors in control signaling. In certain embodiments, first transmissions on the predefined allocation may be prioritized over retransmissions.

In still another embodiment, an apparatus may include a first determining unit configured to determine that a transmission from user equipment was unsuccessful, a second determining unit configured to determine whether a retransmission will collide with a predefined resource for a predetermined transmission time interval, and a transmitting unit configured to transmit an acknowledgement to the user equipment, rather than a request for retransmission, when the second determining unit determines that the retransmission will collide with the predefined resource. In some embodiments, collisions may occur due to one or more of synchronous hybrid automatic repeat request and signaling errors in control signaling. In certain embodiments, first transmissions on the predefined allocation may be prioritized over retransmissions. In certain embodiments, the apparatus may be an enhanced node B of the third generation partnership project.

In another embodiment, a method may include receiving a request for retransmission from a node, determining that the request for retransmission collides with a predefined allocation, prioritizing a first transmission on the predefined allocation and the retransmission in accordance with a prioritization rule, and transmitting either the first transmission or the retransmission depending on the prioritization rule. In some embodiments, the prioritization rule may prioritize first transmissions on the predefined allocation over retransmissions. In some embodiments, the prioritization rule may prioritize retransmissions over first transmissions on the predefined allocation.

In yet another embodiment, an apparatus may include a receiving unit configured to receive a request for retransmission from a node, a determining unit configured to determine that the request for retransmission collides with a predefined allocation, a prioritizing unit configured to prioritize a first transmission on the predefined allocation and the retransmission in accordance with a prioritization rule, and a transmitting unit configured to transmit either the first transmission or the retransmission depending on the prioritization rule. In some embodiments, the prioritizing unit may prioritize first transmissions on the predefined allocation over retransmissions. In some embodiments, the prioritizing unit may prioritize retransmissions over first transmissions on the predefined allocation. In certain embodiments, the apparatus may be user equipment.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

It will be readily understood that the components of various embodiments of the present invention, as generally described and illustrated in the figures herein, may be arranged and designed in a wide variety of different configurations. Thus, the following more detailed description of the embodiments of an apparatus, system, and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

As discussed above, two kinds of allocations for radio access networks, such as E-UTRAN, may be utilized—dynamic allocations and predefined allocations for transmissions, such as first HARQ transmissions. However, with two kinds of allocations for the same user equipment, collisions may occur between predefined resources for the first HARQ transmission, and resources allocated for a retransmission. Certain embodiments are directed to avoiding collisions that can occur when two transmissions are intended to take place during a same transmission time interval. In particular, some embodiments are directed to avoiding collisions between a dynamic allocation and a predefined allocation.

Since only one transmission can typically take place for or from a given piece of user equipment during a given TTI, collisions should generally be avoided. Though an asynchronous HARQ may avoid many collisions through allowing nodes to freely schedule retransmissions, certain high load conditions result in nodes (such as enhanced node B, or eNB) not having the appropriate freedom to schedule a transmission appropriately. In such cases, the eNB may ignore the request from the user equipment for a downlink retransmission. In some embodiments, if a downlink retransmission cannot be scheduled in order to avoid a collision with the predefined resource, no downlink retransmission takes place at the eNB.

Figure 1:
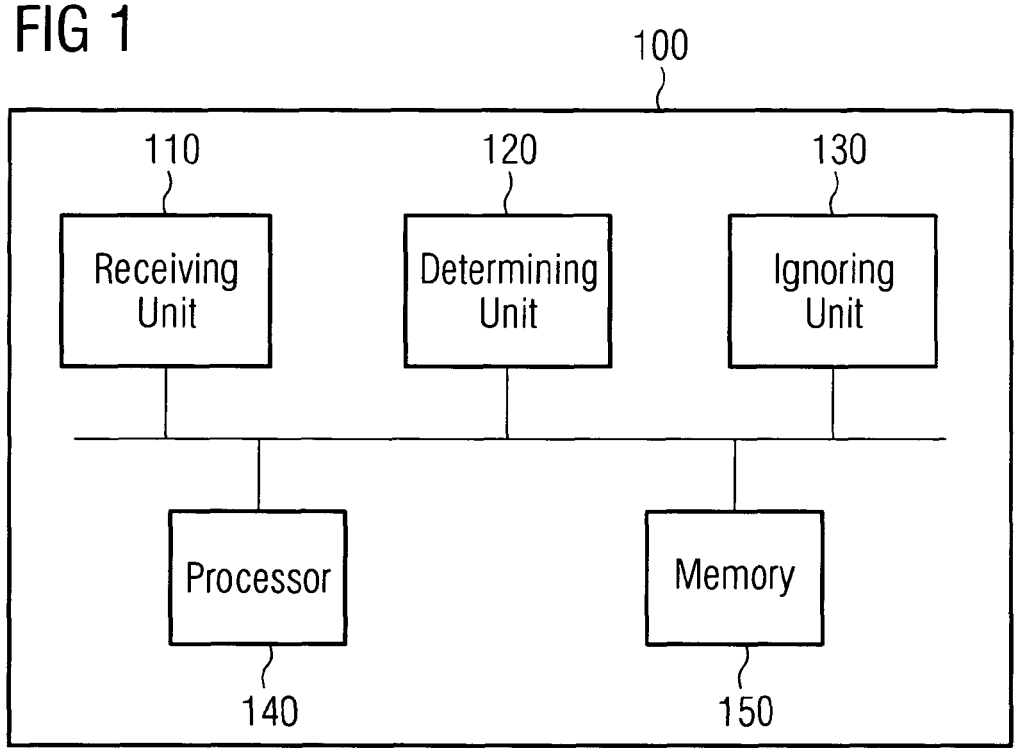
FIG. 1 is a block diagram illustrating a node configured to avoid downlink collisions between dynamic and semi-persistent allocations in a communication network, in accordance with one embodiment of the present invention.

FIG. 1 is a block diagram illustrating a node 100 configured to avoid downlink collisions between dynamic and semi-persistent allocations in a communication network, in accordance with one embodiment of the present invention. The node 100 includes a receiving unit 110, a determining unit 120, an ignoring unit 130, a processor 140 and memory 150. One skilled in the art will recognize that the "node" could also be embodied as a server, a router, or any other suitable network device, or combination of devices. Presenting the above-described functions as being performed by a "node" is not intended to limit the scope of the present invention in any way, but is intended to provide one example of many embodiments of the present invention. Indeed, methods, systems and apparatuses disclosed herein may be implemented in localized and distributed forms consistent with networking technology. "Memory", as discussed herein, may be, for instance, a hard disk drive, flash device, random access memory (RAM), tape, or any other such medium used to store data.

The receiving unit 110 may be configured to receive a request for retransmission from user equipment for a predetermined transmission time interval in a communication network. The determining unit 120 may be configured to determine whether a collision risk exists between the retransmission and another transmission during the predetermined time interval. The ignoring unit 130 may be configured to ignore the retransmission request when the determining unit 120 determines that the collision risk exists. A load in the communication network may be sufficiently high that the node 100 cannot schedule retransmission. The node 100 may be an eNB of the third generation partnership project.

It should be noted that many of the functional features described in this specification have been presented as units, in order to more particularly emphasize their implementation independence. For example, a unit may be implemented as a hardware circuit comprising custom very large scale integration (VLSI) circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be at least partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit. Units may be stored on a computer-readable medium, which may be, for instance, a hard disk drive, flash device, random access memory (RAM), tape, or any other such medium used to store data.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
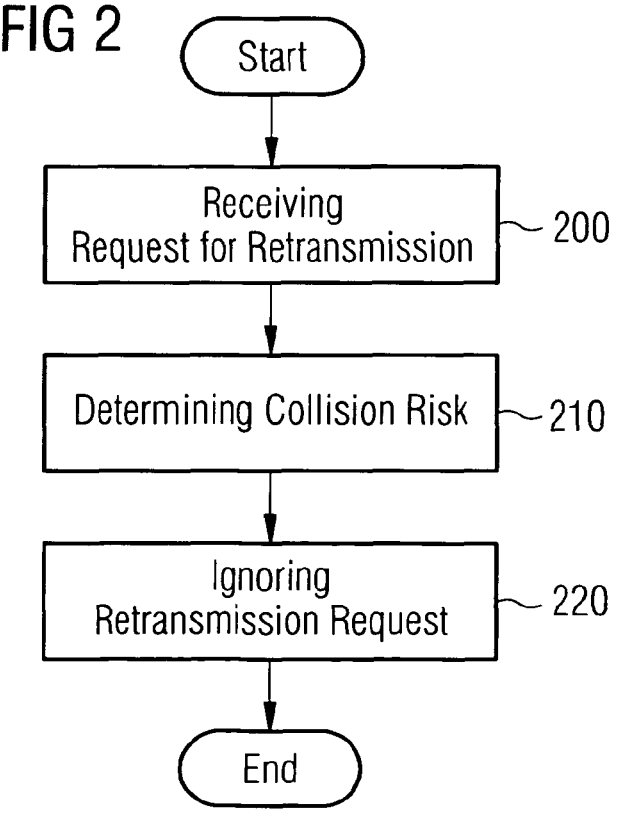
FIG. 2 is a flow chart diagram illustrating a method for avoiding downlink collisions between dynamic and semi-persistent allocations in a communication network, in accordance with one embodiment of the present invention.

FIG. 2 is a flow chart diagram illustrating a method for avoiding downlink collisions between dynamic and semi-persistent allocations in a communication network, in accordance with one embodiment of the present invention. In certain embodiments, the operations of the method depicted in FIG. 2 may be executed by the node 100 of FIG. 1. The method includes receiving a request for retransmission 200 from user equipment for a predetermined transmission time interval in a communication network, determining whether a collision risk exists 210 between the retransmission and another transmission during the predetermined time interval, and ignoring the retransmission request 220 when the determined collision risk exists. A load in the communication network may be sufficiently high that retransmission cannot be scheduled.

In uplink conditions, collisions in some embodiments may be more likely due to synchronous HARQ, and signaling errors in the L1/L2 control signaling. If an uplink retransmission is known to collide with a predefined resource, the eNB may acknowledge the transmission, and avoid requesting retransmission. If an eNB requests an uplink retransmission that would result in a collision with a predefined resource, the eNB may acknowledge the uplink transmissions from the user equipment, even though unsuccessful. As a result, the user equipment will not be asked to perform a retransmission, and the collision with a first transmission on a predefined resource may be avoided.

Figure 3:
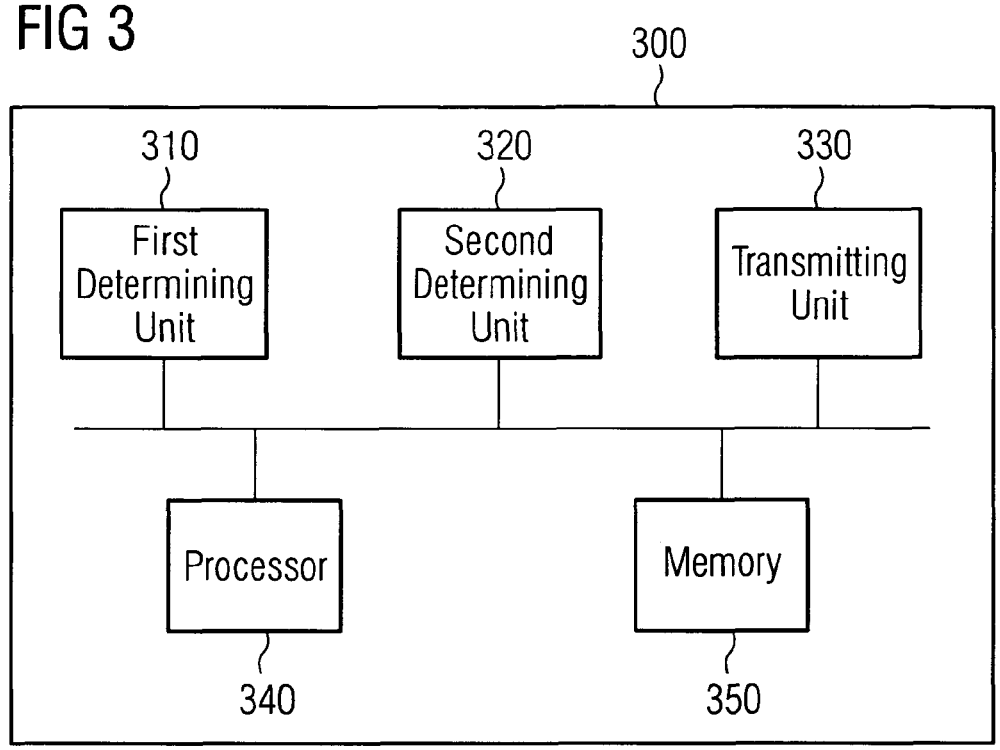
FIG. 3 is a block diagram illustrating a node configured to avoid uplink collisions between dynamic and semi-persistent allocations in a communication network, in accordance with one embodiment of the present invention.

FIG. 3 is a block diagram illustrating a node 300 configured to avoid uplink collisions between dynamic and semi-persistent allocations in a communication network, in accordance with one embodiment of the present invention. The node 300 includes a first determining unit 310, a second determining unit 320, a transmitting unit 330, a processor 340 and memory 350. The first determining unit 310 may be configured to determine that a transmission from user equipment was unsuccessful. The second determining unit 320 may be configured to determine whether a retransmission will collide with a predefined resource for a predetermined transmission time interval. The transmitting unit 330 may be configured to transmit an acknowledgement to the user equipment, rather than a request for retransmission, when the second determining unit 320 determines that the retransmission will collide with the predefined resource.

Collisions may occur due to one or more of synchronous hybrid automatic repeat request and signaling errors in control signaling. First transmissions on the predefined allocation may be prioritized over retransmissions. The node 300 may be an eNB of the third generation partnership project.

Figure 4:
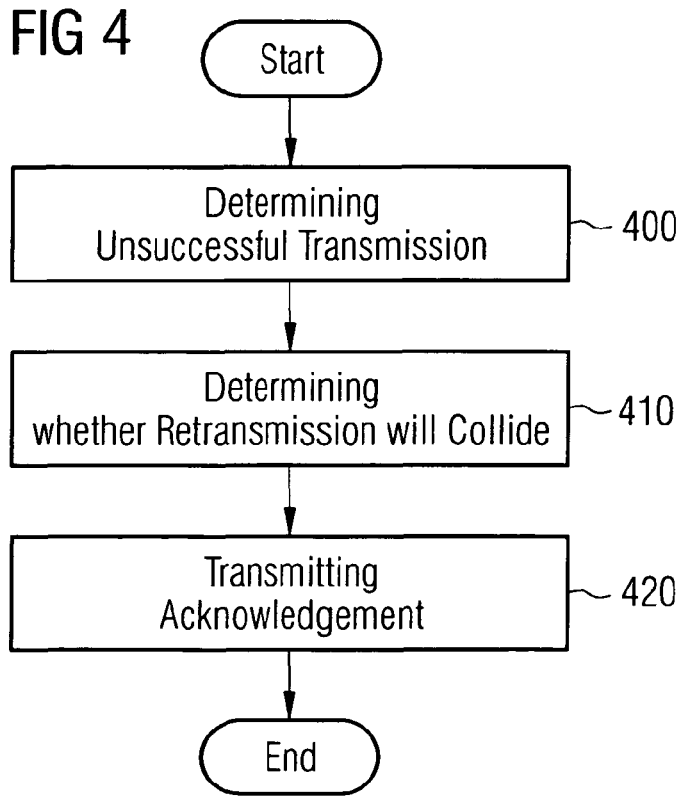
FIG. 4 is a flow chart diagram illustrating a method for avoiding uplink collisions between dynamic and semi-persistent allocations in a communication network, in accordance with one embodiment of the present invention.

FIG. 4 is a flow chart diagram illustrating a method for avoiding uplink collisions between dynamic and semi-persistent allocations in a communication network, in accordance with one embodiment of the present invention. In certain embodiments, the operations of the method depicted in FIG. 4 may be executed by the node 300 of FIG. 3. The method includes determining that a transmission from user equipment was unsuccessful 400, determining whether a retransmission will collide with a predefined resource for a predetermined transmission time interval 410, and transmitting an acknowledgement to the user equipment 420, rather than requesting retransmission, when it is determined that the retransmission will collide with the predefined resource. Collisions may occur due to one or more of synchronous hybrid automatic repeat request and signaling errors in control signaling. First transmissions on the predefined allocation may be prioritized over retransmissions.

However, since signaling errors can occur in any event, the user equipment may still be requested to perform a retransmission although it collides with the predefined allocation. In such case, the user equipment may prioritize first transmission on the predefined allocation over retransmissions. The user equipment can therefore be configured to prioritize first transmissions on the predefined allocation over requested retransmissions.

In some embodiments, the user equipment may be configured to prioritize retransmission to occur prior to the predefined allocation. The determination of which prioritization rule to use may depend on a particular application or the particular needs of the particular application. The implementation of a prioritization rule may be implemented in either the user equipment or in a node, such as an eNB, as appropriate.

Figure 5:
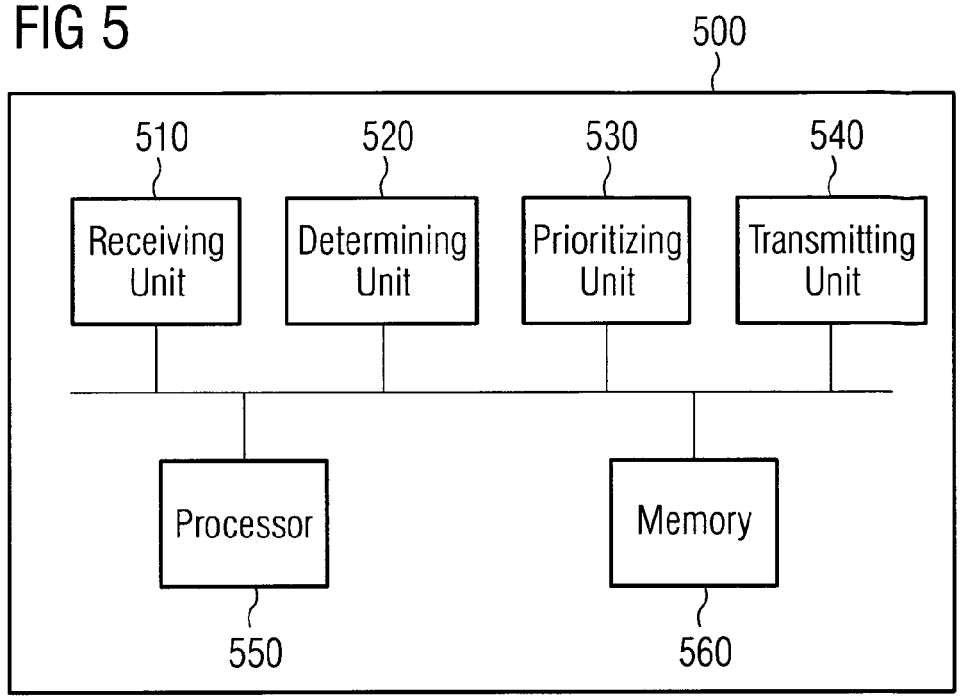
FIG. 5 is a block diagram illustrating user equipment configured to prioritize first transmissions on a predefined allocation and retransmissions, in accordance with one embodiment of the present invention.

FIG. 5 is a block diagram illustrating user equipment 500 configured to prioritize first transmissions on a predefined allocation and retransmissions, in accordance with one embodiment of the present invention. The user equipment 500 includes a receiving unit 510, a determining unit 520, a prioritizing unit 530, a transmitting unit 540, a processor 550 and memory 560. One skilled in the art will readily understand that "user equipment" may include a cellular phone, a pager, a personal data assistant (PDA), a personal computer, or any other device capable of performing the operations associated with the "user equipment" as described herein.

The receiving unit 510 may be configured to receive a request for retransmission from a node. In some embodiments, the node may be the node 100 or the node 300 illustrated in FIGS. 1 and 3, respectively. The determining unit 520 may be configured to determine that the request for retransmission collides with a predefined allocation. The prioritizing unit 530 may be configured to prioritize a first transmission on the predefined allocation and the retransmission in accordance with a prioritization rule. The transmitting unit 540 may be configured to transmit either the first transmission or the retransmission depending on the prioritization rule. The prioritizing unit 540 may prioritize first transmissions on the predefined allocation over retransmissions. The prioritizing unit 540 may also prioritize retransmissions over first transmissions on the predefined allocation.

Figure 6:
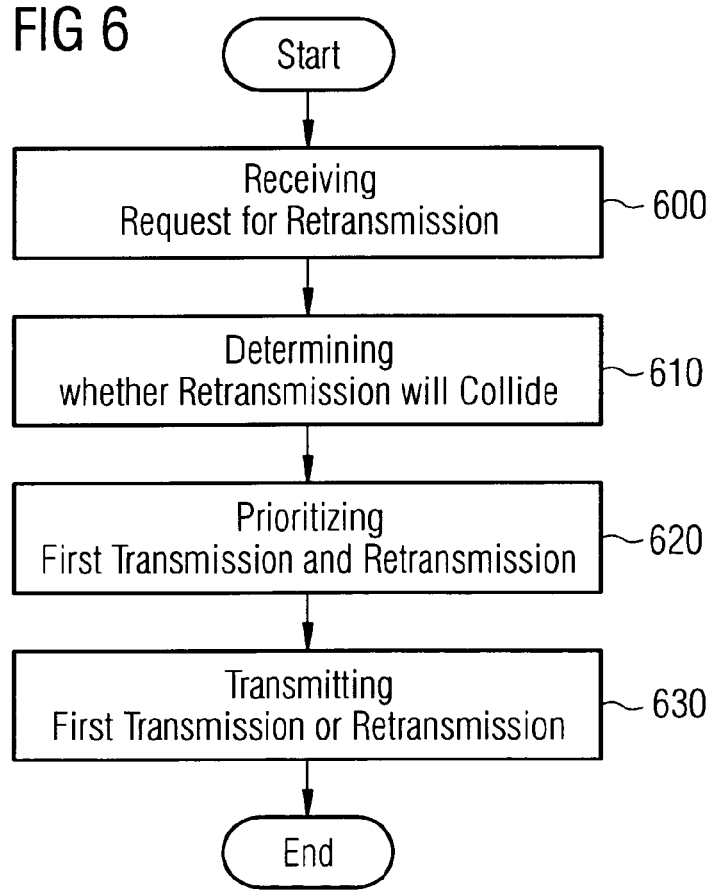
FIG. 6 is a flow diagram illustrating a method for prioritizing first transmissions on a predefined allocation and retransmissions, in accordance with one embodiment of the present invention.

FIG. 6 is a flow diagram illustrating a method for prioritizing first transmissions on a predefined allocation and retransmissions, in accordance with one embodiment of the present invention. In certain embodiments, the operations of the method depicted in FIG. 6 may be executed by the user equipment 500 of FIG. 5. The method includes receiving a request for retransmission from a node 600, determining that the request for retransmission collides with a predefined allocation 610, prioritizing a first transmission on the predefined allocation and the retransmission in accordance with a prioritization rule 620, and transmitting either the first transmission or the retransmission depending on the prioritization rule 630. The prioritization rule may prioritize first transmissions on the predefined allocation over retransmissions. The prioritization rule may also prioritize retransmissions over first transmissions on the predefined allocation.

In the above embodiments, signaling between the user equipment and node, such as eNB, may occur on appropriate control channels. For example, the L1/L2 control channels may be used, since user equipment may monitor L1/L2 control channels in order to identify possible allocations when downlink reception is enabled.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

I claim:

1. A method comprising:
receiving a request from a user equipment for retransmission of an earlier transmission to the user equipment on a dynamic allocation for a predetermined transmission time interval in a communication network;
determining whether a collision risk exists between the retransmission of the earlier transmission to the user equipment and another transmission to the user equipment on a predefined allocation during the predetermined transmission time interval;
prioritizing said another transmission to the user equipment on the predefined allocation and the retransmission on the dynamic allocation in accordance with a prioritization rule; and
ignoring the retransmission request when the collision risk exists or performing the retransmission based on the prioritization rule.

2. The method of claim 1, wherein retransmission is not scheduled when the collision risk exists.

3. An apparatus comprising:
a receiving unit configured to receive a request from a user equipment for retransmission of an earlier transmission to the user equipment on a dynamic allocation for a predetermined transmission time interval in a communication network;
a determining unit configured to determine whether a collision risk exists between the retransmission of the earlier transmission to the user equipment and another transmission to the user equipment on a predefined allocation during the predetermined transmission time interval;
a prioritizing unit configured to prioritize said another transmission to the user equipment on the predefined allocation and the retransmission on the dynamic allocation in accordance with a prioritization rule; and
an ignoring unit configured to ignore the retransmission request when the determining unit determines that the collision risk exists or to perform the retransmission based on the prioritization rule.

4. The apparatus of claim 3, wherein the apparatus does not schedule retransmission when the collision risk exists.

5. The apparatus of claim 3, wherein the apparatus comprises an enhanced node B of the third generation partnership project.

6. A computer program product embodied on a non-transitory computer-readable storage medium, the computer program controlling a processor to perform a process, the process comprising:
receiving a request from a user equipment for retransmission of an earlier transmission to the user equipment on a dynamic allocation for a predetermined transmission time interval in a communication network;
determining whether a collision risk exists between the retransmission of the earlier transmission to the user equipment and another transmission to the user equipment on a predefined allocation during the predetermined transmission time interval;
prioritizing said another transmission to the user equipment on the predefined allocation and the retransmission on the dynamic allocation in accordance with a prioritization rule; and
ignoring the retransmission request when the collision risk exists or performing the retransmission based on the prioritization rule.

7. The computer program product of claim 6, wherein retransmission is not scheduled when the collision risk exists.

8. An apparatus comprising:
one or more processors; and
one or more memories including computer program code;
the one or more memories and the computer program code configured, with the one or more processors, to cause the apparatus to perform:
receiving a request from a user equipment for retransmission of an earlier transmission to the user equipment on a dynamic allocation for a predetermined transmission time interval in a communication network;
determining whether a collision risk exists between the retransmission of the earlier transmission to the user equipment and another transmission to the user equipment on a predefined allocation during the predetermined transmission time interval;
prioritizing said another transmission to the user equipment on the predefined allocation and the retransmission on the dynamic allocation in accordance with a prioritization rule; and
ignoring the retransmission request when the collision risk exists or performing the retransmission based on the prioritization rule.

9. A method comprising:
determining that a transmission from a user equipment was unsuccessful;
determining whether a retransmission of the transmission from the user equipment on a dynamic allocation will collide with a predefined allocation for the user equipment for a predetermined transmission time interval;
prioritizing said retransmission from the user equipment on the dynamic allocation and the predefined allocation for the user equipment for the predetermined transmission time interval in accordance with a prioritization rule; and
transmitting an acknowledgement to the user equipment, when it is determined that the retransmission will collide with the predefined allocation, or requesting retransmission based on the prioritization rule.

10. The method of claim 9, wherein collisions occur due to one or more of synchronous hybrid automatic repeat request and signaling errors in control signaling.

11. The method of claim 9, wherein first transmissions on the predefined allocation are prioritized over retransmissions.

12. An apparatus comprising:
a first determining unit configured to determine that a transmission from a user equipment was unsuccessful;
a second determining unit configured to determine whether a retransmission of the transmission from the user equipment on a dynamic allocation will collide with a predefined allocation for the user equipment for a predetermined transmission time interval;
a prioritizing unit configured to prioritize said retransmission from the user equipment on the dynamic allocation and the predefined allocation for the user equipment for the predetermined transmission time interval in accordance with a prioritization rule; and
a transmitting unit configured to transmit an acknowledgement to the user equipment; when the second determining unit determines that the retransmission will collide with the predefined allocation, or to request retransmission based on the prioritization rule.

13. The apparatus of claim 12, wherein collisions occur due to one or more of synchronous hybrid automatic repeat request and signaling errors in control signaling.

14. The apparatus of claim 12, wherein first transmissions on the predefined allocation are prioritized over retransmissions.

15. The apparatus of claim 12, wherein the apparatus comprises an enhanced node B of the third generation partnership project.

16. A computer program product embodied on a non-transitory computer-readable storage medium, the computer program controlling a processor to perform a process, the process comprising:
determining that a transmission from a user equipment was unsuccessful;
determining whether a retransmission of the transmission from the user equipment on a dynamic allocation will collide with a predefined allocation for the user equipment for a predetermined transmission time interval;
prioritizing said retransmission from the user equipment on the dynamic allocation and the predefined allocation for the user equipment for the predetermined transmission time interval in accordance with a prioritization rule; and
transmitting an acknowledgement to the user equipment, when it is determined that the retransmission will collide with the predefined allocation, or requesting retransmission based on the prioritization rule.

17. The computer program product of claim 16, wherein collisions occur due to one or more of synchronous hybrid automatic repeat request and signaling errors in control signaling.

18. The computer program product of claim 16, wherein first transmissions on the predefined allocation are prioritized over retransmissions.

19. An apparatus comprising:
one or more processors; and
one or more memories including computer program code;
the one or more memories and the computer program code configured, with the one or more processors, to cause the apparatus to perform:
determining that a transmission from a user equipment was unsuccessful;
determining whether a retransmission of the transmission from the user equipment on a dynamic allocation will collide with a predefined allocation for the user equipment for a predetermined transmission time interval;

prioritizing said retransmission from the user equipment on the dynamic allocation and the predefined allocation for the user equipment for the predetermined transmission time interval in accordance with a prioritization rule; and transmitting an acknowledgement to the user equipment, when it is determined that the retransmission will collide with the predefined allocation, or requesting retransmission based on the prioritization rule.

20. A method comprising:

receiving a request from a node for retransmission of an earlier transmission to the node on a dynamic allocation for a predetermined transmission time interval in a communication network;

determining whether the retransmission of the earlier transmission to the node collides with a predefined allocation for the node for the predetermined transmission time interval;

prioritizing a first transmission to the node on the predefined allocation and the retransmission on the dynamic allocation in accordance with a prioritization rule; and transmitting to the node either the first transmission or the retransmission depending on the prioritization rule.

21. The method of claim 20, wherein the prioritization rule prioritizes first transmissions on the predefined allocation over retransmissions.

22. The method of claim 20, wherein the prioritization rule prioritizes retransmissions over first transmissions on the predefined allocation.

23. An apparatus comprising:

a receiving unit configured to receive a request from a node for retransmission of an earlier transmission to the node on a dynamic allocation for a predetermined transmission time interval in a communication network;

a determining unit configured to determine whether the retransmission of the earlier transmission to the node collides with a predefined allocation for the node for the predetermined transmission time interval;

a prioritizing unit configured to prioritize a first transmission to the node on the predefined allocation and the retransmission on the dynamic allocation in accordance with a prioritization rule; and a transmitting unit configured to transmit to the node either the first transmission or the retransmission depending on the prioritization rule.

24. The apparatus of claim 23, wherein the prioritizing unit is configured to prioritize first transmissions on the predefined allocation over retransmissions.

25. The apparatus of claim 23, wherein the prioritizing unit is configured to prioritize retransmissions over first transmissions on the predefined allocation.

26. The apparatus of claim 23, wherein the apparatus comprises user equipment.

27. A computer program product embodied on a non-transitory computer-readable storage medium, the program controlling a processor to perform a process, the process comprising:

receiving a request from a node for retransmission of an earlier transmission to the node on a dynamic allocation for a predetermined transmission time interval in a communication network;

determining whether the retransmission of the earlier transmission to the node collides with a predefined allocation for the node for the predetermined transmission time interval;

prioritizing a first transmission to the node on the predefined allocation and the retransmission on the dynamic allocation in accordance with a prioritization rule; and transmitting to the node either the first transmission or the retransmission depending on the prioritization rule.

28. The computer program product of claim 27, wherein the prioritization rule prioritizes first transmissions on the predefined allocation over retransmissions.

29. The computer program product of claim 27, wherein the prioritization rule prioritizes retransmissions over first transmissions on the predefined allocation.

30. An apparatus comprising:

one or more processors; and one or more memories including computer program code;

the one or more memories and the computer program code configured, with the one or more processors, to cause the apparatus to perform:

receiving a request from a node for retransmission of an earlier transmission to the node on a dynamic allocation for a predetermined transmission time interval in a communication network;

determining whether the retransmission of the earlier transmission to the node collides with a predefined allocation for the node for the predetermined transmission time interval;

prioritizing a first transmission to the node on the predefined allocation and the retransmission on the dynamic allocation in accordance with a prioritization rule; and transmitting to the node either the first transmission or the retransmission depending on the prioritization rule.

* * * * *